(12) United States Patent
Jacobs

(10) Patent No.: US 7,092,259 B2
(45) Date of Patent: *Aug. 15, 2006

(54) ACTIVE CLAMP DC/DC CONVERTER WITH RESONANT TRANSITION SYSTEM

(76) Inventor: Mark E. Jacobs, 7615 Applecross La., Dallas, TX (US) 75248-2317

(*) Notice: Subject to any disclaimer, the term of this patent is extended or adjusted under 35 U.S.C. 154(b) by 0 days.

This patent is subject to a terminal disclaimer.

(21) Appl. No.: 11/119,110

(22) Filed: Apr. 29, 2005

(65) Prior Publication Data

US 2005/0190582 A1    Sep. 1, 2005

Related U.S. Application Data

(63) Continuation-in-part of application No. 10/435,410, filed on May 9, 2003, now Pat. No. 6,903,944.

(51) Int. Cl.
*H02M 3/335* (2006.01)

(52) U.S. Cl. ....................................... 363/20

(58) Field of Classification Search .................. 363/20, 363/21.01, 39, 40; 323/222, 290

See application file for complete search history.

(56) References Cited

U.S. PATENT DOCUMENTS

| 5,198,969 | A   | 3/1993  | Redl et al.      |
| 5,327,333 | A   | 7/1994  | Boylan et al.    |
| 5,402,329 | A   | 3/1995  | Wittenbreder     |
| RE36,098  | E   | 2/1999  | Vinciarelli      |
| 6,191,960 | B1  | 2/2001  | Fraidlin et al.  |
| 6,288,920 | B1  | 9/2001  | Jacobs et al.    |
| 6,377,476 | B1  | 4/2002  | Fraidlin et al.  |
| 6,445,597 | B1  | 9/2002  | Boylan et al.    |
| 6,483,724 | B1  | 11/2002 | Blair et al.     |
| 6,903,944 | B1* | 6/2005  | Jacobs .......................... 363/20 |

OTHER PUBLICATIONS

C.S. Leu, et al., "Comparison of Forward Topologies with Various Reset Schemes," VPEC Seminar Proceedings, Sep. 15-17, 1991, pp. 101-109, vol. 9, Virginia Power Electronics Center, Blacksburg, VA, USA.

* cited by examiner

*Primary Examiner*—Adolf Berhane

(57) ABSTRACT

A dc-dc converter is disclosed comprising an active clamp topology, including an active clamp resonant transition system to provide substantially zero or reduced voltage for turn-on of the primary switch. The resonant transition system includes an inductor in series with the primary winding of the power transformer and a clamp diode that operate cooperatively to turn on the primary switch with reduced voltage. A second diode is included in series with a balancing resistor to discharge a snubber capacitor with improved efficiency. The addition of these circuit components provides low switching losses and low component stresses in the overall design.

18 Claims, 5 Drawing Sheets

FIG. 1 *Prior art*

ACTIVE CLAMP DC/DC CONVERTER WITH RESONANT TRANSITION SYSTEM

This application is a continuation in part of application Ser. No. 10/435,410, filed May 9, 2003 now U.S. Pat. No. 6,903,944, entitled "Active Clamp DC/DC Converter with Resonant Transition System," which application is incorporated herein by reference.

REFERENCES

The following references are hereby incorporated herein in their entirety.

U.S. Patent Documents

| | | |
|---|---|---|
| 5,198,969 | March 1993 | Redl et al. |
| 5,327,333 | July 1994 | Boylan et al. |
| 5,402,329 | March 1995 | Wittenbreder |
| RE36,098 | February 1998 | Vinciarelli |
| 6,288,920 | September 2001 | Jacobs, et al. |
| 6,377,476 | April 2002 | Fraidlin, et al. |
| 6,445,597 | September 2002 | Boylan et al. |
| 6,483,724 | November 2002 | Blair et al. |

Other Publications

C. S. Leu, et al., Comparison of Forward Topologies with Various Reset Schemes, 1991 VPEC Seminar Proceedings, Sep. 15–17, 1991, pp. 101–109.

TECHNICAL FIELD OF THE INVENTION

The present invention is directed in general to power converters, and, more specifically, to an active clamp power converter with improved zero-voltage switching of the primary power transistor to reduce turn-on switching losses.

BACKGROUND OF THE INVENTION

The active clamp switching topology for DC/DC converters is well known in the field of electronic power conversion, and its advantages and operation are described by Leu, et al. Further explanation of its operation and circuit variations are described by Vinciarelli (RE-36,098), Boylan (U.S. Pat. No. 5,327,333), Jacobs (U.S. Pat. No. 6,288,920), Fraidlin (U.S. Pat. No. 6,377,476), and Boylan (U.S. Pat. No. 6,445,598). Numerous switching circuit topologies are known that provide practical means of dc-dc conversion, for example, variations of the full and half bridge topologies, the flyback topology, the SEPIC topology, and others. But an outstanding characteristic of the active clamp topology is its ability to provide a minimum sustained voltage stress on the output rectifying diodes when the power supply is required to operate over a range of input voltages. This characteristic may allow the use of lower voltage-rated parts for the output diodes, providing both performance improvement and lower cost.

The active clamp topology is configured with two active switches on the primary side of the power transformer that alternately conduct during substantially non-overlapping/contiguous time periods during a switching cycle. One switch, the primary switch, closes for a duty cycle D to couple the primary of the power transformer to an input power source, and then a second switch, the reset switch, coupled to a clamp capacitor and the primary of the power transformer, closes for a complementary time period 1-D to reset the flux in the power transformer to substantially its value at the beginning of a switching cycle. A characteristic of the active clamp topology in many practical applications is the ability to close the reset switch at any rated load with insignificant turn-on loss, i.e., with zero-voltage switching (ZVS). This requires a brief delay between turn-off of the primary switch and turn-on of the reset switch, and this timing is generally not critical because the body diode in a MOSFET transistor, which is the common but not required implementation of these active switches, automatically conducts at the required turn-on time. If a switch technology different from a MOSFET is used, a diode is assumed effectively to be in parallel with the controlled terminals of the switch to reduce the switch turn-on timing uncertainty.

However, the switching transition from the reset switch conducting to the primary switch conducting often does not result in ZVS at higher rated load currents for the active clamp power converter. This occurs because the current in the magnetizing inductance of the power transformer, which is a principal energy source to enable ZVS for this switching transition, is often insufficient to counteract the output current reflected to the primary winding of the power transformer at higher load currents. The reflected output current flows in the primary winding in a direction opposite to the direction of the magnetizing current at this time. Reducing the magnetizing inductance of the power transformer to increase the magnetizing current is usually not practical because reducing the magnetizing inductance generally increases power loss due to a resulting higher level of recirculating current. The result is only a partial reduction in the voltage across the primary switch when the reset switch is opened at higher output currents. The switch voltage rings with parasitic circuit capacitance and inductance until the primary switch is enabled to conduct. Thus, the primary switch is turned on while sustaining substantial voltage across its controlled terminals, resulting in loss of energy stored in parasitic capacitance. Turning on the primary switch without ZVS may also cause additional losses elsewhere in the circuit.

Thus, while the active clamp topology has benefits such as a low voltage rating for the rectifying diodes and ZVS for the reset switch, it suffers from inability to provide ZVS during the transition from the reset switch conducting to the primary switch conducting at higher load currents. Accordingly, what is needed in the art is a way to preserve the benefits of the active clamp circuit topology while providing a way to achieve ZVS or substantially reduced switch voltage during the reset-to-primary switching transition at higher load currents, thereby providing reduced switching losses for the converter.

SUMMARY OF THE INVENTION

To address the above-discussed deficiencies of the prior art, the present invention provides an active clamp resonant transition system and method of operating the same for use with an active clamp power converter having a power transformer with a primary and a secondary winding, a primary switch coupling the primary of the power transformer to an input power source, and a reset switch coupled to a clamp capacitor and to the primary of the power transformer to reset the flux in the power transformer to substantially its value at the beginning of a switching cycle. In one embodiment, an active clamp resonant transition system includes an inductor coupled between the primary winding of the power transformer and the primary switch, and a diode coupled between the inductor and the clamp capacitor. In a further embodiment, the active clamp resonant transition system includes a second diode coupled between the inductor and ground. In a preferred embodiment, the active clamp resonant transition system includes a snubber capacitor coupled between the inductor and the diode. In a preferred embodiment, the active clamp resonant transition system includes a circuit element coupled between the clamp capacitor and the snubber capacitor. In a further embodiment, circuit element is configured as a resistor. In a preferred embodiment, the active clamp resonant transition system includes a diode coupled in series with the resistor that is coupled between the clamp capacitor and the snubber capacitor. In a preferred embodiment, a brief delay, such as a delay between 30 and 300 nanoseconds, is provided between turn-off of the reset switch and turn-on of the primary switch. In a preferred embodiment, a brief delay, again, such as a delay between 30 and 300 nanoseconds, is provided between turn-off of the primary switch and turn-on of the reset switch.

Another embodiment of the present invention is a method of reducing switch turn-on voltage in an active clamp power converter having a power transformer with a primary and a secondary winding, a primary switch coupling the primary of the power transformer to an input power source, and a reset switch coupled to a clamp capacitor and the primary of the power transformer. The method includes coupling the primary winding of the power transformer to an input power source with a primary switch, coupling a reset switch to a clamp capacitor and the primary of the power transformer, coupling an inductor between the primary winding of the power transformer and the primary switch, coupling a series circuit arrangement of a first diode and a snubber capacitor to the inductor and the primary winding of the power transformer, and coupling a circuit element and a second diode between the clamp capacitor and the snubber capacitor. In a further embodiment, the method includes configuring the circuit element with a resistor. In a further embodiment, the method includes coupling a third diode between the inductor and ground. In a further embodiment, the method includes providing a brief delay between turn-off of the reset switch and turn-on of the primary switch. In a further embodiment, the method includes providing a brief delay between turn-off of the primary switch and turn-on of the reset switch.

The foregoing has broadly outlined preferred and alternative features of the present invention so that those skilled in the art may understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention in its broadest form.

BRIEF DESCRIPTION OF THE DRAWINGS

For a more complete understanding of the present invention, reference is now made to the following descriptions taken in conjunction with the accompanying drawings, in which:

FIG. 4 includes a waveform representing the voltage across the resistor coupled between the clamp capacitor and the snubber capacitor.

DETAILED DESCRIPTION

Figure 1:
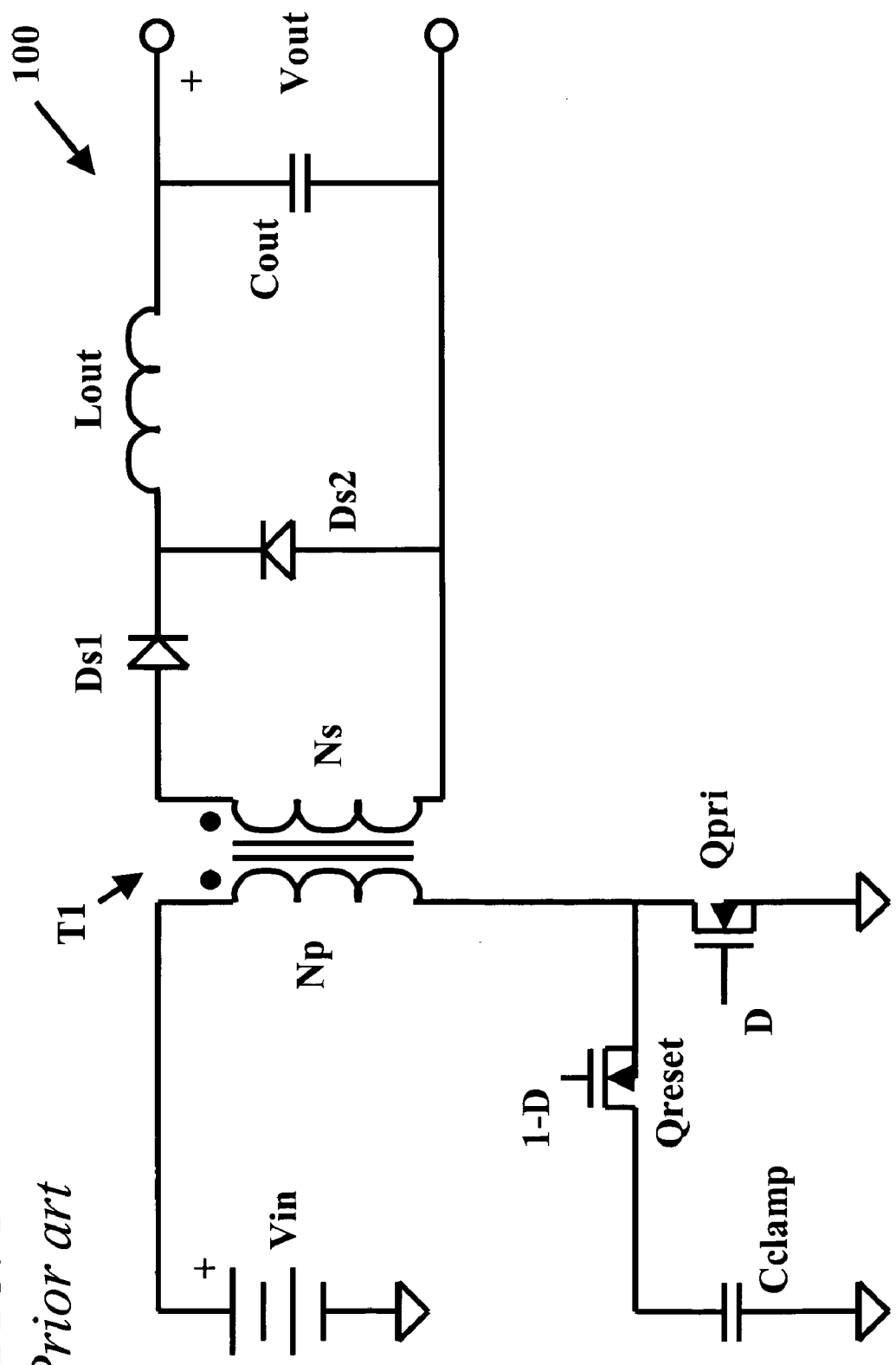
FIG. 1 illustrates a schematic diagram of an active clamp power converter of the prior art.

FIG. 1 illustrates an active clamp power converter 100 of the prior art. The dc input power source, Vin, which typically ranges, for example, between 36 and 75 volts for typical telecommunications systems, supplies input power to the power transformer T1. The transformer T1 has Np primary turns and Ns secondary turns that are selected to provide a required output voltage with consideration of the resulting duty cycle and stress on power train components. The primary switch Qpri, shown in FIG. 1 as an n-channel MOSFET, is controlled by a pulse-width controller (not shown) that controls Qpri to be conducting for a duty cycle D. The reset switch Qreset, also shown on FIG. 1 as an n-channel MOSFET, is coupled to the clamp capacitor Cclamp and the primary switch Qpri. The switch Qreset is controlled to conduct for a substantially complementary period 1-D. The duty cycle D is adjusted by the pulse-width controller to regulate a characteristic of the output, such as output voltage, output current, or a combination of the two. The ac voltage appearing on the secondary of the power transformer is rectified by the forward diode Ds1 and the freewheeling diode Ds2, and the dc component of the resulting waveform is coupled to the output through the low-pass filter consisting of the inductor Lout and the capacitor Cout producing an output voltage Vout. Active switches such as MOSFETs may be substituted for either or both of the diodes Ds1 and Ds2 to improve power conversion efficiency. The secondary winding of the transformer T1 may be tapped, as is well understood in the art, to increase the dc component of the voltage presented to the low-pass filter in relation to the ac components of that voltage. The sense of the secondary winding, Ns, of the power transformer may also be reversed to operate the converter in a flyback mode. Various other secondary-side rectification arrangements may be used, for example a current doubler, as described in Blair, et al., U.S. Pat. No. 6,483,724. The active clamp power converter is a familiar design choice for switching power converters, and further details of its operation and design are described in the previously cited references.

During the switching transition from the primary switch Qpri conducting to the reset switch Qreset conducting, a ZVS transition is usually easily obtained. This occurs because the power transformer magnetizing current referenced to its primary, and the output current, also referenced to the primary, both flow in the same direction. This direction is such that opening the primary switch usually causes its parasitic capacitance to be charged and the parasitic capacitance of the reset switch to be discharged by these currents, enabling the body diode of the reset switch automatically to conduct after a brief delay, such as a delay between 30 and 300 nanoseconds, providing a substantially lossless, ZVS transition.

However, during the switching transition from the reset switch Qreset conducting to the primary switch Qpri conducting, a ZVS transition is usually difficult to obtain at high load currents. This occurs because the power transformer magnetizing current referenced to its primary, and the output current, also referenced to the primary, flow in opposite directions. If the output current is low, then the power transformer magnetizing current may be sufficient to obtain a ZVS transition; modest gapping of the power transformer core may be employed to reduce the magnetizing inductance so that sufficient energy is provided to obtain ZVS. However, particularly at higher output currents, the direction of the reflected output current flow to the primary of the power transformer subtracts from the energy that would otherwise be available to obtain ZVS for this transition. Gapping the transformer sufficiently to retain ZVS at high output currents is usually not practical because the required level of recirculating magnetizing current would create substantial additional losses.

Other switching topologies exhibit corresponding switching characteristics. The phase-shifted full bridge exhibits two "easy" ZVS transitions and two that are similarly difficult. Redl and Balogh in U.S. Pat. No. 5,198,969 take advantage of pairs of primary power switches coupled in series between two input power rails in a four-state, phase-shifted bridge and provide an inductor and two clamp diodes to achieve ZVS for the more difficult transitions. Blair, et al., in U.S. Pat. No. 6,483,724 B1 provide an inductor and two clamp diodes between two input power rails to achieve ZVS for the more difficult transitions in a three-state bridge. However, in the active clamp power converter, the two primary power switches are not coupled between two input power rails, obviating that choice to recirculate power with minimal loss back to an input power source.

Figure 2:
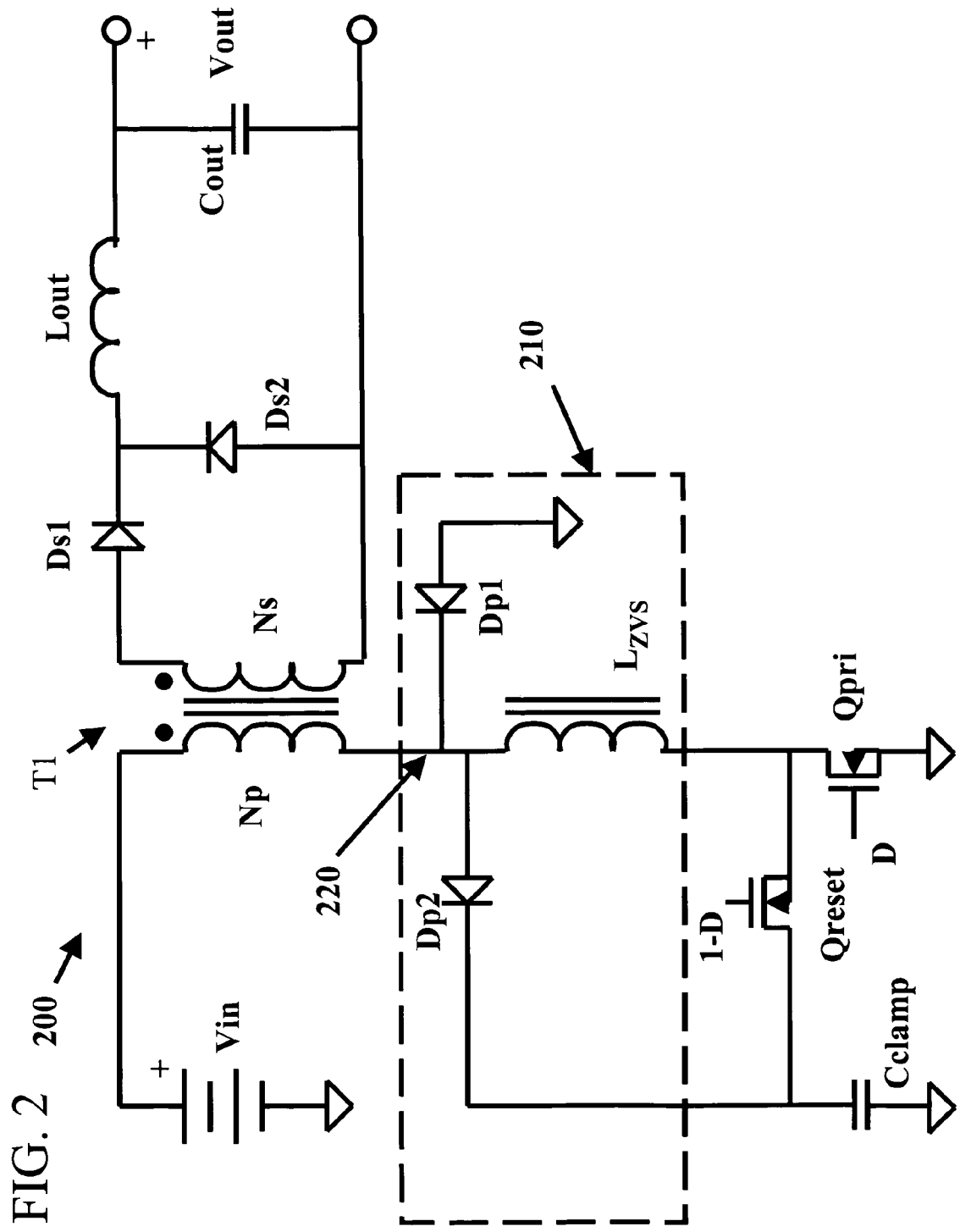
FIG. 2 illustrates a schematic diagram of an embodiment of an active clamp power converter utilizing an n-channel MOSFET for the primary switch, an n-channel MOSFET for the reset switch, and an active clamp resonant transition system, constructed according to the principles of the present invention.

In FIG. 2 is shown a schematic diagram of an embodiment of the present invention for an active clamp power converter including an active clamp resonant transition system. The active clamp power converter 200 utilizes an n-channel MOSFET for the primary switch Qpri and an n-channel MOSFET for the reset switch Qreset. The inductor $L_{ZVS}$ provides an energy source to achieve ZVS or reduced turn-on voltage for the reset-to-primary switching transition, providing a resonant turn-on transition for the primary switch Qpri. The diode Dp2 clamps the circuit node 220 coupling the inductor $L_{ZVS}$ and the primary of the power transformer T1 to the clamp capacitor Cclamp. Excess energy stored in $L_{ZVS}$ during the switching transition is resonantly transferred to the clamp capacitor through the diode Dp2. It is desirable to return the excess energy stored in the clamp capacitor to the input power source. This circuit arrangement allows the return of excess energy transferred to the clamp capacitor Cclamp to the input power source in a substantially lossless manner during the on time of the reset switch. The inductor Lzvs also provides an energy source to assist in reducing voltage associated with turn-on of the reset switch. The diode Dp1 is preferably included to clamp the circuit node 220 to ground, and also to allow transfer to the clamp capacitor of the excess energy in $L_{ZVS}$ associated with the primary-to-reset transition; in this transition the body diode of Qreset resonantly couples energy from $L_{ZVS}$ to the clamp capacitor. The essential operation of the circuit is retained if active switches are substituted for one or both of the diodes Dp1 and Dp2. The remaining circuit elements in FIG. 2 correspond functionally to similarly identified elements in FIG. 1. Thus, the active clamp resonant transition system 210 providing zero or reduced turn-on voltage for the main switch as illustrated in FIG. 2 comprises the inductor $L_{ZVS}$, the diode Dp2, and, preferably, the diode Dp1.

Figure 3:
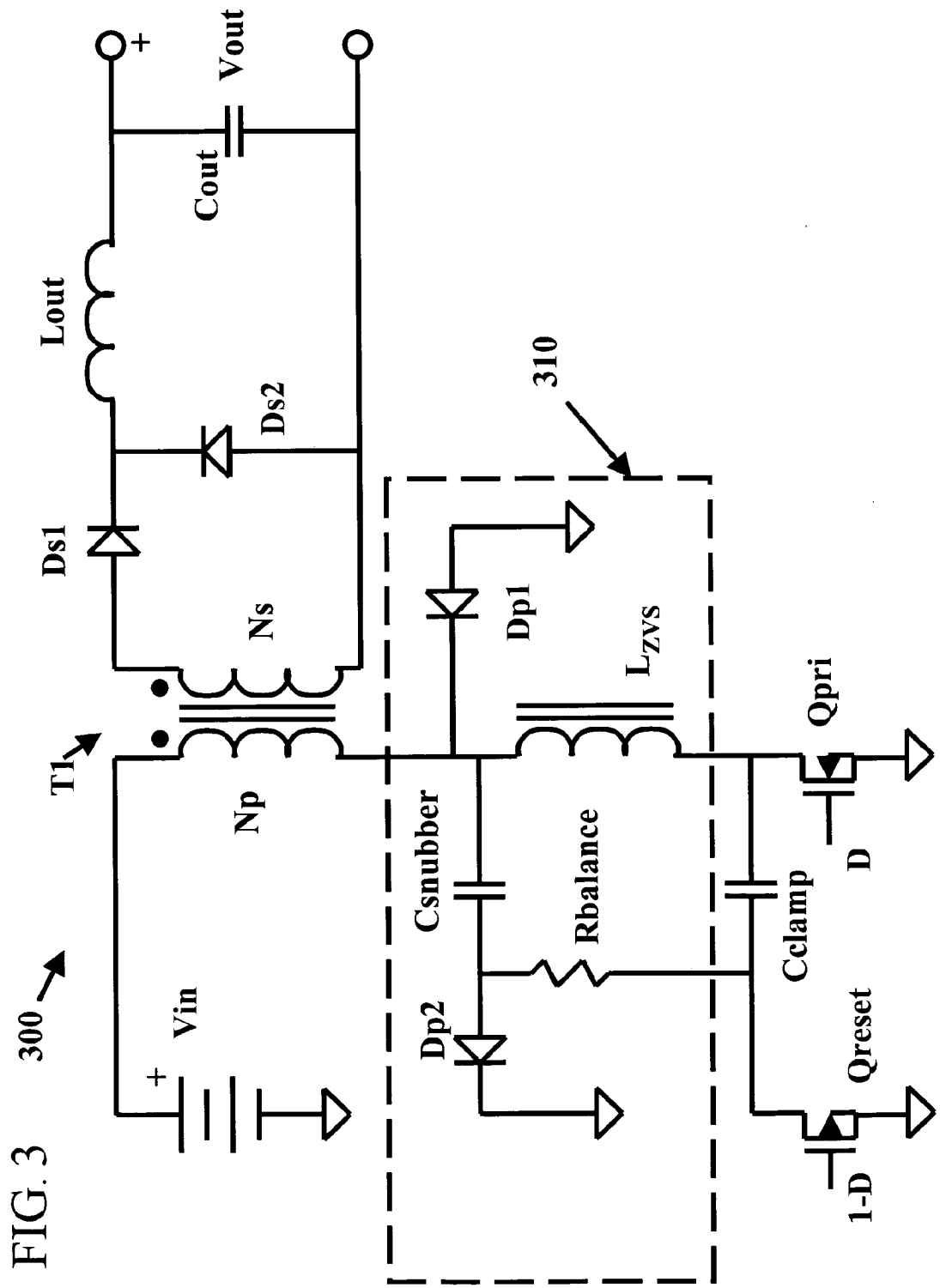
FIG. 3 illustrates a schematic diagram of an embodiment of an active clamp power converter utilizing an n-channel MOSFET for the primary switch, a p-channel MOSFET for the reset switch, and an active clamp resonant transition system, constructed according to the principles of the present invention.

In FIG. 3 is shown a schematic diagram of an embodiment of the present invention for an active clamp power converter 300 including an active clamp resonant transition system. The active clamp power converter utilizes an n-channel MOSFET for the primary switch Qpri and a p-channel MOSFET for the reset switch Qreset. Using a p-channel MOSFET for the reset switch allows its source to be grounded, simplifying its gate drive arrangement in a practical circuit. The inductor $L_{ZVS}$ provides an energy source to achieve ZVS for the reset-to-primary switching transition or reduced turn-on voltage, providing a resonant turn-on transition for the primary switch Qpri. The diode Dp2 clamps the node coupling the inductor $L_{ZVS}$ and the primary of the power transformer T1 utilizing a capacitor Csnubber. A circuit element, shown in FIG. 3 as the resistor Rbalance, removes excess charge accumulated in the capacitor Csnubber during the reset-to-primary transition and transfers this charge to the clamp capacitor with only modest power loss. Other circuit elements can be substituted for the resistor Rbalance to remove excess charge accumulated in the capacitor Csnubber such as an active switch. The reset switch Qreset transfers excess charge in the clamp capacitor Cclamp back to the input power source in a substantially lossless manner. The diode Dp1 operates in a manner similar to its operation in the circuit shown in FIG. 2. The remaining circuit elements in FIG. 3 correspond functionally to similarly identified elements in FIG. 1 and FIG. 2. Thus, the active clamp resonant transition system 310 providing zero or reduced turn-on voltage for the main switch as illustrated in FIG. 3 comprises the inductor $L_{zvs}$ coupled between the primary winding of the power transformer and the primary switch, the series circuit arrangement of the diode Dp2 and the snubber capacitor coupled to the inductor $L_{zvs}$ and to the primary winding of the power transformer, the circuit element Rbalance coupled between the clamp capacitor and the snubber capacitor, and, preferably, the diode Dp1.

The capacitor Csnubber sustains a voltage comparable to the voltage of the clamp capacitor Cclamp. Accordingly, the power loss in the resistor Rbalance is not substantial, and does not significantly detract from the relatively lossless energy transfers associated with the switching transitions. Thus a practical circuit arrangement to recover excess energy associated with the switching transitions is provided.

Figure 4:
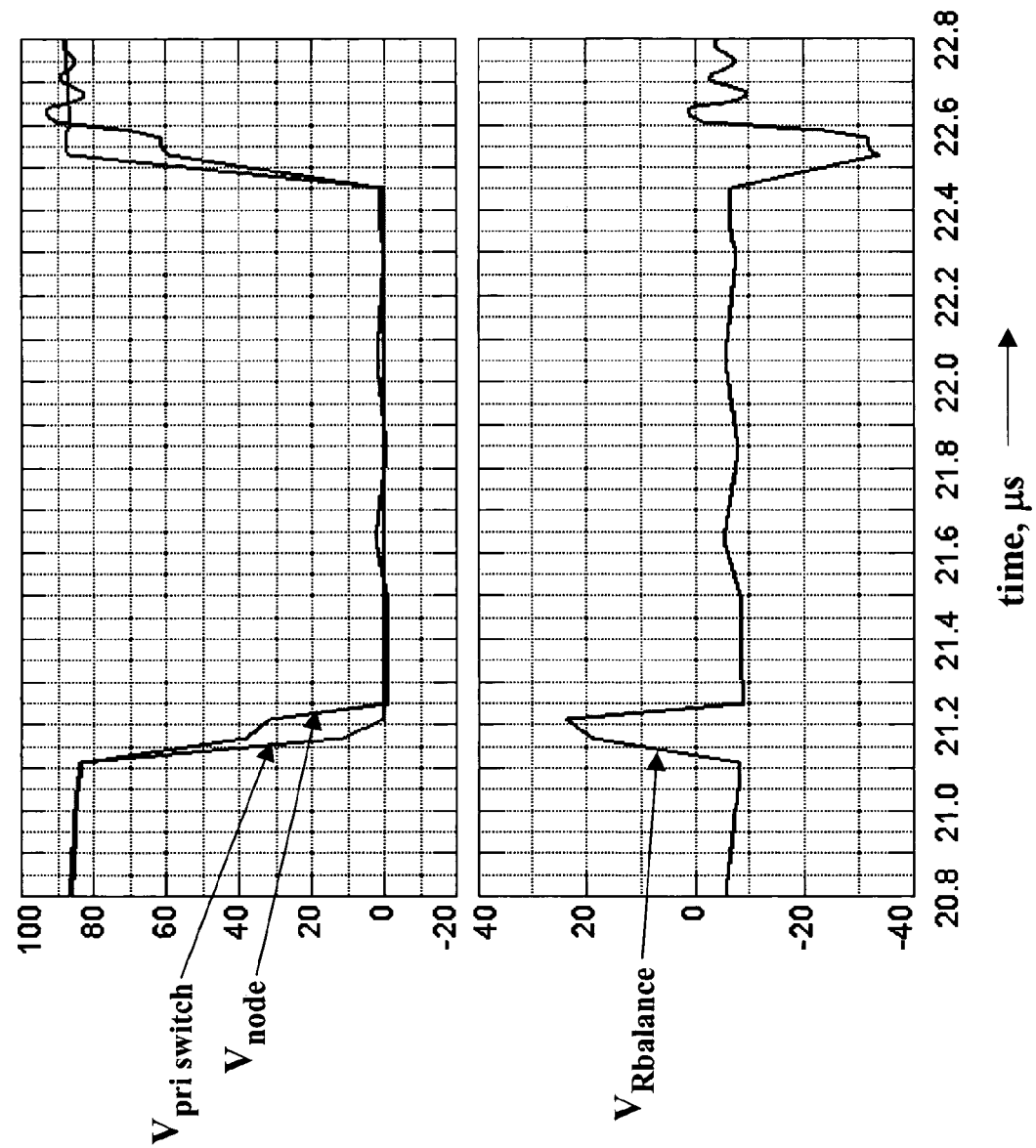
FIG. 4 illustrates waveforms for the circuit in FIG. 3 representing the drain-to-source voltage of the primary switch and the voltage at the node coupling the active clamp resonant transition system to the primary of the power transformer, illustrating both transitions of a switching cycle.

Exemplary component values for an active clamp power converter represented in FIG. 3, powered from a 48-volt input, switching at 330 kHz with 15 μH of power transformer magnetizing inductance and 0.1 μH of leakage inductance referenced to the primary winding, with equal primary and secondary turns, are listed below:

$L_{ZVS}$=0.2 µH
$C_{clamp}$=0.22 µF
$R_{balance}$=1000 Ω
$C_{snubber}$=0.05 µF
$L_{out}$=20 µH
$C_{out}$=20 µF FIG. 4 shows voltages for the circuit in FIG. 3 for both switching transitions from a circuit simulation that includes representative component parasitic resistance and capacitance, with the component values above and a 3-ohm load. In FIG. 4 in the top graph are shown the drain-to-source voltage Vpri across the primary switch and the voltage Vnode at the node coupling the active clamp resonant transition system to the primary of the power transformer. The reset switch is disabled to conduct at approximately 21.1 µs, and the primary switch is enabled to conduct at approximately 21.25 µs. The primary switch is disabled to conduct at approximately 22.45 µs, and the reset switch is enabled to conduct at approximately 22.55 µs.

In FIG. 4 in the bottom graph is shown the voltage $V_{Rbalance}$ across a 1000-ohm resistor $R_{balance}$ coupled between the clamp capacitor and the snubber capacitor. The dissipation in the 1000-ohm resistor is about 80 mW, and the power delivered to the load is approximately 130 W, illustrating the insubstantial level of power dissipation in the resistor $R_{balance}$.

Figure 3A:
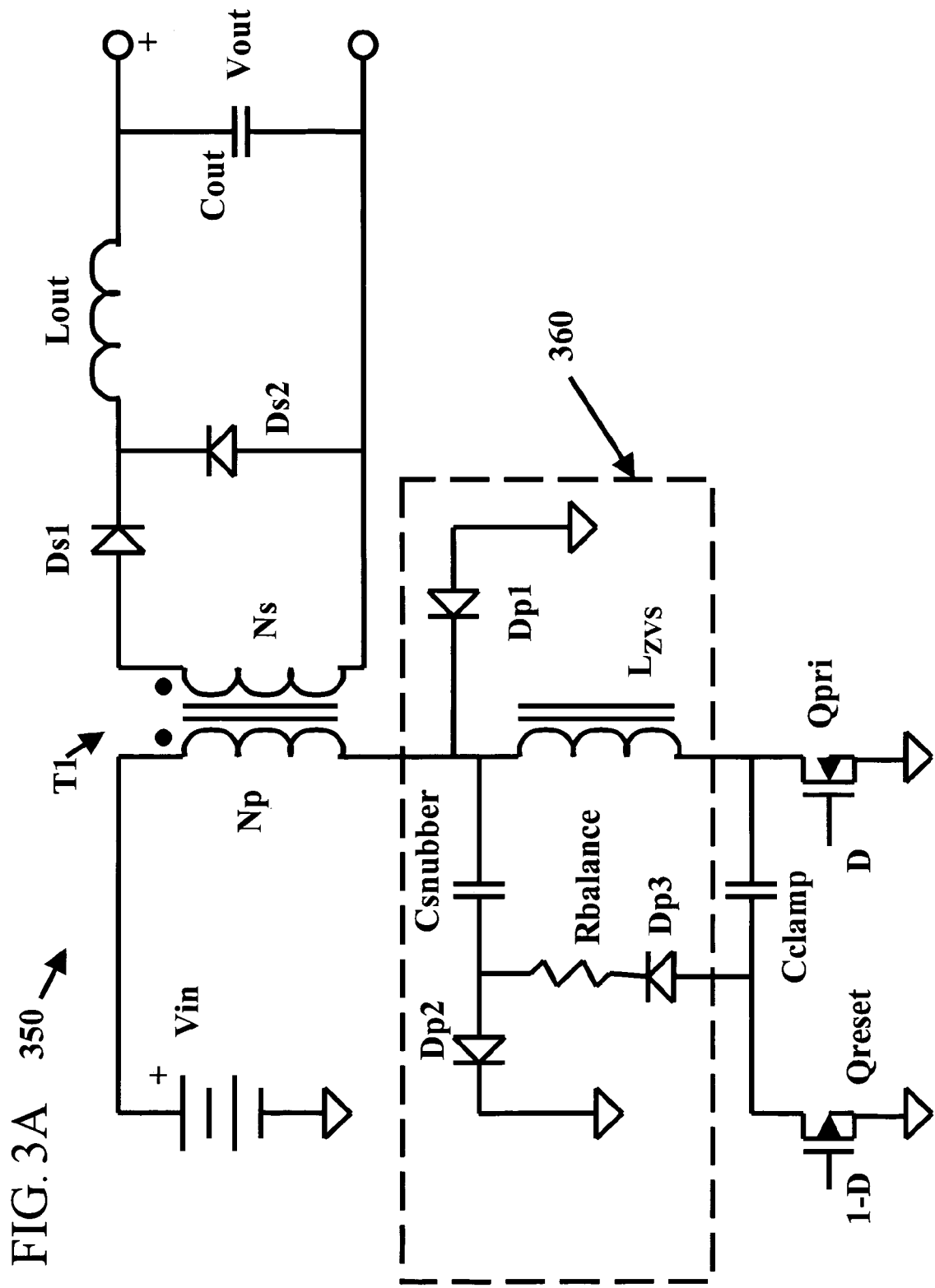
FIG. 3A illustrates a schematic diagram of an embodiment of an active clamp power converter utilizing an n-channel MOSFET for the primary switch, a p-channel MOSFET for the reset switch, and an active clamp resonant transition system, constructed according to the principles of the present invention.

Referring now to FIG. 3A, illustrated is a schematic diagram of an embodiment of the present invention for an active clamp power converter 350, including an active clamp resonant transition system. The active clamp power converter utilizes an n-channel MOSFET for the primary switch Qpri and a p-channel MOSFET for the reset switch Qreset. The active clamp resonant transition system 360 includes diode Dp3 coupled in series with the resistor Rbalance. As illustrated in the lower graph in FIG. 4, the resistor Rbalance without the diode Dp3 sustains voltage pulses with opposing voltage polarities during a switching cycle, resulting in more than a minimum power dissipation in the resistor Rbalance to discharge excess charge from the capacitor Csnubber. One voltage pulse is of polarity to charge the capacitor Cbalance, and the other is of polarity to discharge it. By including a diode, a voltage pulse across the resistor Rbalance that charges the capacitor Csnubber is eliminated, resulting in a more efficient circuit. The remaining circuit elements in FIG. 3A correspond functionally to similarly identified elements in FIG. 3 and will not be redescribed. Thus, the active clamp resonant transition system 360 providing zero or reduced turn-on voltage for the main switch as illustrated in FIG. 3A comprises the inductor $L_{ZVS}$ coupled between the primary winding of the power transformer and the primary switch, the series circuit arrangement of the diode Dp2 and the snubber capacitor coupled to the inductor $L_{ZVS}$ and to the primary winding of the power transformer, the series circuit comprising the circuit element Rbalance and the diode Dp3 coupled between the clamp capacitor and the snubber capacitor, and, preferably, the diode Dp1.

Although the present invention has been described in detail and with reference to specific embodiments, those skilled in the art should understand that various changes, substitutions and alterations can be made as well as alterative embodiments of the invention without departing from the spirit and scope of the invention in its broadest form.

What is claimed is:

1. An active clamp power converter, comprising:
   a power transformer with a primary winding;
   a primary switch coupling the primary winding of the power transformer to an input power source;
   a reset switch coupled to a clamp capacitor and to the primary winding of the power transformer;
   an inductor coupled between the primary winding of the power transformer and the primary switch; and
   a first diode coupled between the inductor and the clamp capacitor.

2. The active clamp power converter as recited in claim 1, further comprising a second diode coupled between the inductor and ground.

3. The active clamp resonant transition system as recited in claim 1, further comprising a brief delay between turn-off of the reset switch and turn-on of the primary switch.

4. The active clamp resonant transition system as recited in claim 1, further comprising a brief delay between turn-off of the primary switch and turn-on of the reset switch.

5. An active clamp power converter, comprising:
   a power transformer with a primary winding;
   a primary switch coupling the primary winding of a power transformer to an input power source;
   a reset switch coupled to a clamp capacitor and the primary winding of the power transformer;
   an inductor coupled between the primary winding of the power transformer and the primary switch; and
   a series circuit arrangement of a first diode and a snubber capacitor coupled to the inductor and to the primary winding of the power transformer.

6. The active clamp resonant transition system as recited in claim 5, further comprising a second diode coupled between the inductor and ground.

7. The active clamp resonant transition system as recited in claim 5, further comprising a circuit element coupled between the clamp capacitor and the snubber capacitor.

8. The active clamp resonant transition system as recited in claim 7, further comprising a third diode coupled in series with the circuit element.

9. The active clamp resonant transition system as recited in claim 7, wherein the circuit element is a resistor.

10. The active clamp resonant transition system as recited in claim 5, further comprising a brief delay between turn-off of the reset switch and turn-on of the primary switch.

11. The active clamp resonant transition system as recited in claim 5, further comprising a brief delay between turn-off of the primary switch and turn-on of the reset switch.

12. A method of reducing switch turn-on voltage in an active clamp power converter having a power transformer with a primary winding, comprising:
   coupling the primary winding of the power transformer to an input power source with a primary switch;
   coupling a reset switch to a clamp capacitor and to the primary winding of the power transformer;
   coupling an inductor between the primary winding of the power transformer and the primary switch;
   coupling a series circuit arrangement of a first diode and a snubber capacitor to the inductor and to the primary winding of the power transformer; and
   coupling a circuit element between the clamp capacitor and the snubber capacitor.

13. The method as recited in claim 12, further comprising coupling a second diode between the inductor and ground.

14. The method as recited in claim 12, further comprising coupling a circuit element between the clamp capacitor and the snubber capacitor.

15. The method as recited in claim 14, further comprising coupling a third diode in series with the circuit element.

16. The method as recited in claim 14, wherein the circuit element is a resistor.

17. The method as recited in claim 12, further comprising providing a brief delay between turn-off of the reset switch and turn-on of the primary switch.

18. The method as recited in claim 12, further comprising providing a brief delay between turn-off of the primary switch and turn-on of the reset switch.

* * * * *